US011326655B2

(12) United States Patent
Breja et al.

(10) Patent No.: US 11,326,655 B2
(45) Date of Patent: May 10, 2022

(54) MATERIAL REDUCTION MACHINE WITH DRIVETRAIN PROTECTION SYSTEM

(71) Applicant: Vermeer Manufacturing Company, Pella, IA (US)

(72) Inventors: Joseph Edward Breja, Pella, IA (US); John David Vande Noord, Pella, IA (US); Daniel James Soldan, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 372 days.

(21) Appl. No.: 16/707,227

(22) Filed: Dec. 9, 2019

(65) Prior Publication Data

US 2020/0178482 A1   Jun. 11, 2020

Related U.S. Application Data

(60) Provisional application No. 62/778,248, filed on Dec. 11, 2018.

(51) Int. Cl.
*F16D 48/06* (2006.01)
*A01G 23/06* (2006.01)
(Continued)

(52) U.S. Cl.
CPC .......... *F16D 48/06* (2013.01); *A01G 23/067* (2013.01); *B02C 25/00* (2013.01); *B02C 18/24* (2013.01);
(Continued)

(58) Field of Classification Search
CPC ........................................... F16D 2500/10437
See application file for complete search history.

(56) References Cited

U.S. PATENT DOCUMENTS 4,523,892 A   6/1985   Mitchell et al.
5,031,742 A   7/1991   Dischler
(Continued)

FOREIGN PATENT DOCUMENTS

WO   2009018364 A1   2/2009

OTHER PUBLICATIONS

"Disengaging Torque Limiter with Automatic Re-engagement from Mayr"—https://www.motioncontroltips.com/disengaging-torque-limiter-automatic-re-engagement-mayr/ (Dec. 20, 2016).
(Continued)

*Primary Examiner* — Timothy Hannon
(74) *Attorney, Agent, or Firm* — Michael Best & Friedrich LLP (57) ABSTRACT

A material reduction machine including an engine, a material reduction tool, a drivetrain, and a control system. The drivetrain is between the engine and the material reduction tool, and includes a coupling and a power transfer element, the coupling having an engaged state and a disengaged state. When engaged, the coupling enables power transfer through the power transfer element and when disengaged, the coupling inhibits power transfer through the power transfer element. The control system includes a sensor to detect a speed of the engine or the material reduction tool, a drivetrain protection system to protect the power transfer element by disengaging the coupling, and a controller to enable the drivetrain protection system based on a first signal from the sensor indicating the speed is at or above a first threshold, and to disengage the coupling based on a second signal indicating the speed is below a second threshold.

23 Claims, 8 Drawing Sheets

(51) Int. Cl.
*B02C 25/00* (2006.01)
*B02C 18/24* (2006.01)

(52) U.S. Cl.
CPC .............. *F16D 2500/10418* (2013.01); *F16D 2500/10437* (2013.01); *F16D 2500/3067* (2013.01); *F16D 2500/70424* (2013.01)

(56) References Cited

U.S. PATENT DOCUMENTS

| | | | |
|---|---|---|---|
| 5,588,474 | A | 12/1996 | Egging |
| 6,014,996 | A | 1/2000 | Egging et al. |
| 6,557,687 | B1 * | 5/2003 | Herchick ............ F16D 25/0638 |
| | | | 192/82 T |
| 6,564,915 | B2 | 5/2003 | Lorentz et al. |
| 7,011,124 | B1 | 3/2006 | Morey |
| 7,225,909 | B1 * | 6/2007 | Kalinsky ................. F16D 48/10 |
| | | | 192/85.49 |
| 8,066,619 | B2 * | 11/2011 | Herchick ................. F16D 48/06 |
| 10,060,486 | B2 * | 8/2018 | Omran ................... B60K 25/02 |
| 2014/0083393 | A1 * | 3/2014 | Cattani ................... F02D 41/08 |
| | | | 123/349 |
| 2018/0112726 | A1 * | 4/2018 | Sparks .................... F16D 7/027 |
| 2019/0136919 | A1 * | 5/2019 | Boland ................. F16D 48/066 |

OTHER PUBLICATIONS

European Patent Office Extended Search Report for Application No. 19215194.2 dated Apr. 20, 2020 (7 pages).

* cited by examiner

MATERIAL REDUCTION MACHINE WITH DRIVETRAIN PROTECTION SYSTEM

CROSS-REFERENCE TO RELATED APPLICATIONS

This application claims priority to U.S. Provisional Patent Application No. 62/778,248, filed Dec. 11, 2018, the entire contents of which are incorporated by reference herein.

BACKGROUND

The present invention relates to material reduction machines, and more particularly to a drivetrain protection system for material reduction machines.

Material reduction machines such as stump cutter machines are well known. These machines commonly include a rotating cutter wheel driven by a prime mover (e.g., a gas or diesel engine). The cutter wheel, while rotating, is advanced toward the stump and moved laterally across the face of the stump. Often, the cutter wheel is automatically advanced across the face of the stump in a sweeping motion. The cutter wheel is mounted to one end of a boom which is, in turn, pivotally mounted on a support frame. Hydraulic boom swing cylinders are used to pivot the boom about the pivot point to move the cutter wheel back and forth across the face of the stump to cut it away.

The handles may also provide additional functions, including determining the presence of the operator. The operator station of a stump cutter machine often includes hydraulic control levers that are operated by the operator and other switches/controls. During operation, the entire machine is advanced gradually into the stump, which may require the operator to alter his/her standing position to remain comfortably in front of the controls.

In many existing stump cutter machines, the engine is operably connected to the cutter wheel by belts that facilitate rotation of the cutter wheel. These belts may fail due to aggressive cutting in which the cutter wheel and/or the engine are overloaded (e.g., when attempting to remove a significant portion of the stump being cut). More specifically, aggressive use of the stump cutter machine may cause the drive belt may break due to an increased load on the belt.

SUMMARY

In one aspect, the invention provides a material reduction machine including an engine, and a material reduction tool. A drivetrain includes a coupling and a power transfer element coupled to and driven by the engine when the coupling is in an engaged state, the engaged state configured to transfer power from the engine through the power transfer element for driving the material reduction tool. The coupling further has a disengaged state configured to inhibit transfer of power from the engine through the power transfer element. A control system includes a sensor, a drivetrain protection system, and a controller. The sensor is in communication with the engine or the material reduction tool to detect a speed of the engine or the material reduction tool. The drivetrain protection system is selectively operable during operation of the material reduction tool and, when triggered, configured to protect the power transfer element by putting the coupling into the disengaged state. The controller includes instructions configured to enable the drivetrain protection system in response to a first signal from the sensor indicative of the speed at or above a first threshold, the controller further including instructions to trigger the drivetrain protection system in response to a second signal from the sensor indicative of the speed below a second threshold.

In another aspect, the invention provides a material reduction machine including an engine, and a material reduction tool. A drivetrain includes a coupling and a belt coupled to and driven by the engine when the coupling is in an engaged state, the engaged state configured to transfer power from the engine through the belt for driving the material reduction tool. The coupling further has a disengaged state configured to inhibit transfer of power from the engine through the belt. A control system includes a sensor, a drivetrain protection system, and a controller. The sensor is in communication with the engine to detect a speed of the engine. The drivetrain protection system is selectively operable during operation of the material reduction tool and, when triggered, configured to protect the belt by putting the coupling into the disengaged state. The controller includes instructions configured to enable the drivetrain protection system in response to a first signal from the sensor indicative of the speed at or above a first threshold, the controller further including instructions to trigger the drivetrain protection system in response to a second signal from the sensor indicative of the speed below a second threshold.

In yet another aspect, the invention provides a method of controlling a material reduction machine including an engine and a material reduction tool. A drivetrain is provided, including a power transfer element positioned between the engine and the material reduction tool and a coupling having an engaged state configured to enable transfer of power from the engine through the power transfer element for driving the material reduction tool, the coupling further having a disengaged state configured to inhibit transfer of power from the engine through the power transfer element. The engine is run at an engine speed, and a rotational speed is imparted to the material reduction tool by transferring power from the engine to the material reduction tool via the drivetrain, including the power transfer element, with the coupling is in the engaged state. A sensor senses one or both of the engine speed and the rotation speed of the material reduction tool and reports signals to a controller of a control system. Via the controller, a drivetrain protection system is enabled in response to a first signal from the sensor reporting the sensed engine speed or rotation speed at or above a first threshold. Via the controller, the drivetrain protection system is triggered to protect the power transfer element by putting the coupling into the disengaged state in response to a second signal from the sensor reporting the sensed engine speed or rotation speed below a second threshold.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
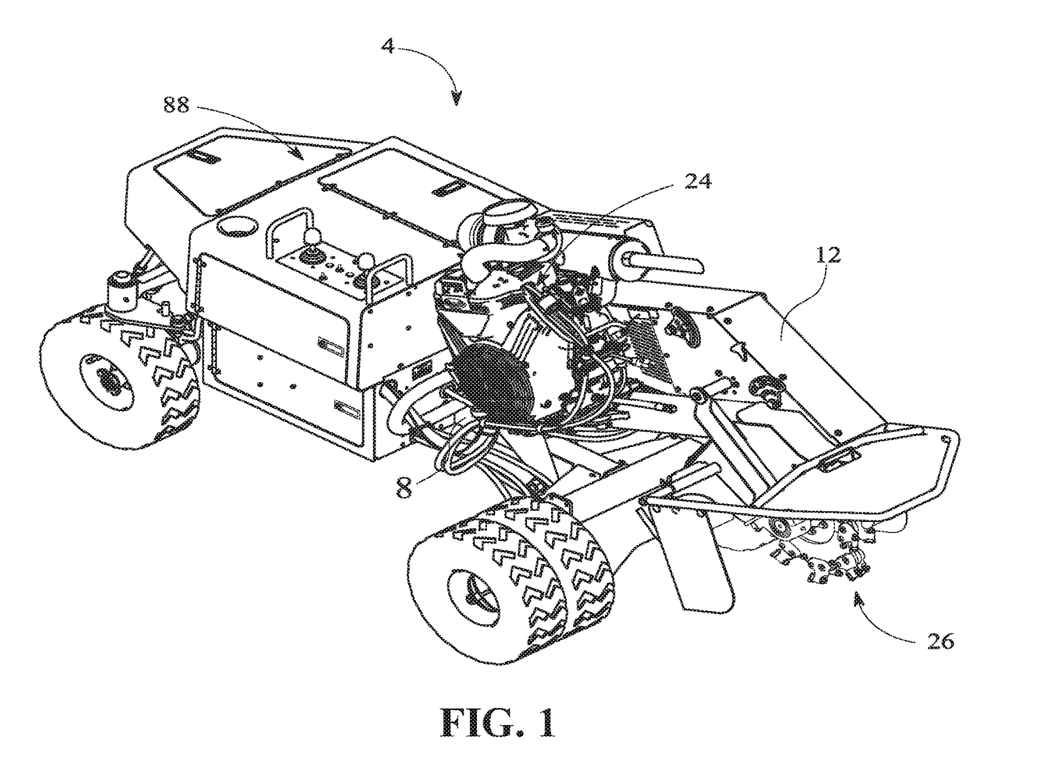
FIG. 1 is a perspective view of an exemplary stump cutter machine including a cutter wheel.
Figure 2:
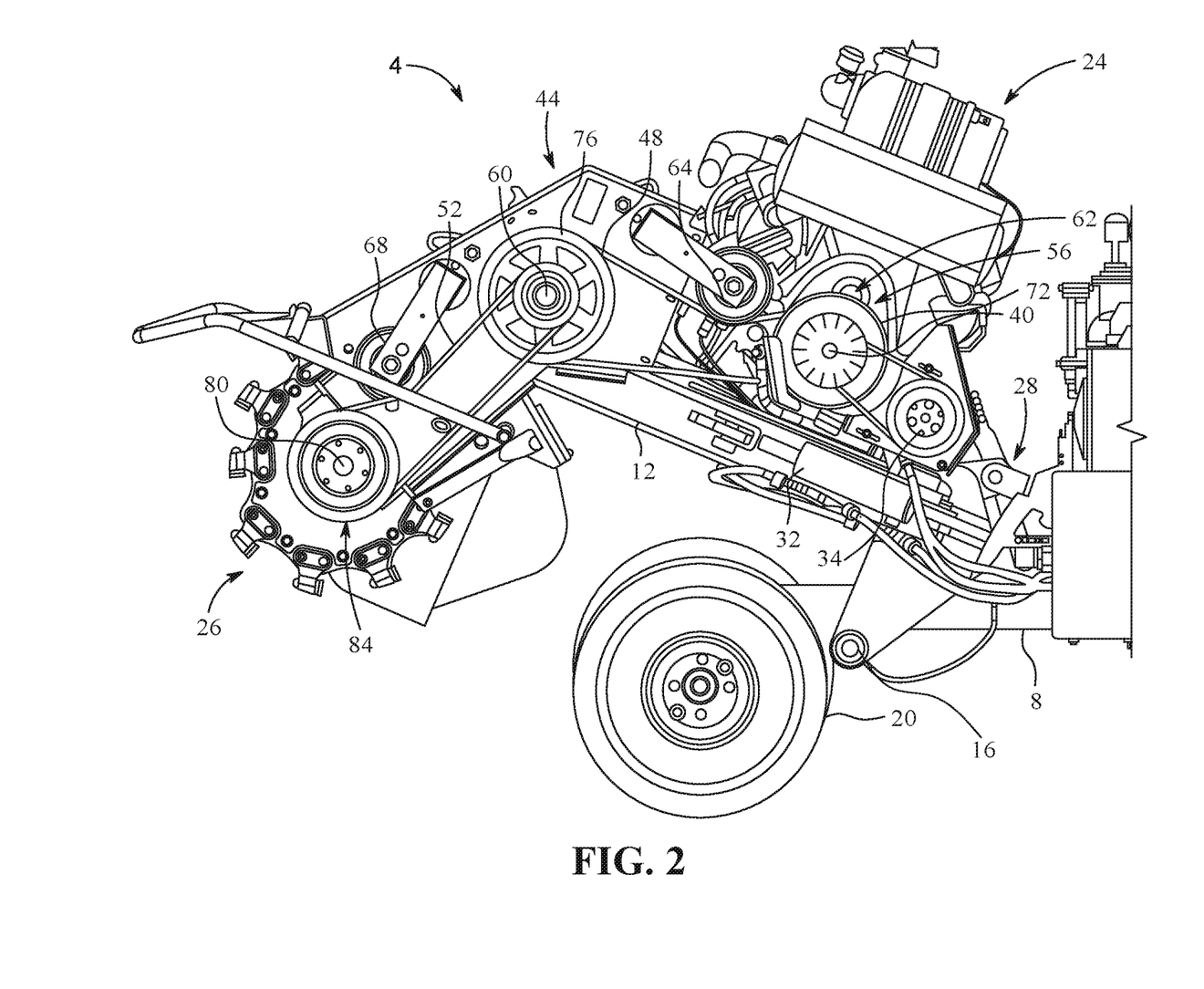
FIG. 2 is a side elevation view of the stump cutter machine of FIG. 1 including the cutter wheel and belts that drive the cutter wheel via a prime mover of the stump cutter machine.

FIGS. 1 and 2 illustrate an exemplary material reduction or stump cutter machine 4 embodying the present invention. The stump cutter machine 4 includes a frame 8 that has a movable boom 12 pivotally attached to the frame 8 about a horizontal axis (defined through a pin 16). As described in detail below, the boom 12 also is movable in a lateral sweeping motion relative to the frame 8 (e.g., automatic sweep). Wheels 20 are rotatably attached to the frame 8 via an axle to enable movement of the stump cutter machine 4. It will be appreciated that the stump cutter machine 4 can move across a surface in other ways (e.g., using tracks in lieu of wheels 20).

The stump cutter machine 4 also includes a prime mover or engine 24 (e.g., a gasoline or diesel engine, a battery pack, etc.) that is mounted on the boom 12, and a cutter wheel or material reduction tool 26 that is mounted adjacent a distal end of the boom 12. For purposes of the description and claims, the terms 'prime mover' and 'engine' are interchangeable and are intended to refer to any appropriate mechanism for driving the cutter wheel 26.

During operation, the engine 24, provides hydraulic fluid to one or more boom lift cylinders 28 and boom swing cylinders 32 (e.g., via one or more pumps 34 driven by the engine 24) to facilitate movement of the boom 12 that, in turn, moves the cutter wheel 26 into and across the face of the stump being cut. More specifically, the boom lift cylinder 28 raises and lowers the boom 12, and the boom swing cylinder 32 oscillates the boom 12 in a lateral arc relative to the frame 8.

The cutter wheel 26 is operatively coupled to and driven by the engine 24. In particular, and with reference to FIGS. 1 and 3, the engine 24 has a crankshaft or output shaft 40 that is coupled to the cutter wheel 26 by a drivetrain 44. The drivetrain 44 has a first belt 48, a second belt 52, an electric clutch or coupling 56 to connect the engine 24 to the drivetrain 44, a jackshaft 60, and a brake 62 (e.g., spring brake). The illustrated first and second belts 48, 52 are non-limiting examples of power transfer elements of the drivetrain 44, and are tensioned by tension wheels 64, 68. Each of the belts 48, 52 is a flexible, endless power transmission belt that couples spaced-apart rotatable components for rotation together at a predetermined speed ratio (e.g., pulley diameter ratio). The first belt 48 is coupled to the output shaft 40 by a pulley 72 attached to the output shaft 40 (e.g., selectively through the clutch 56). The first belt 48 also is coupled to a pulley 76 that is attached to the jackshaft 60. In this manner, the first belt 48 wraps around the pulleys 72, 76, and is driven by rotation of the output shaft 40. The second belt 52 is coupled to the jackshaft 60 by the pulley 76 and to a driveshaft 80 of the cutter wheel 26 by a pulley 84. In this manner, the second belt 52 wraps around the pulleys 76, 84, and is driven by movement of the first belt 48. In some constructions, the intermediate pulley 76 is formed in two parts co-rotatable together, with separate parts for the separate belts 48, 52. The pulleys 72, 76, 84 disclosed herein may take any suitable form of pulley, sheave, or wheel. It will be appreciated that the cutter wheel 26 can be driven in other ways (e.g., via a hydrostatic system, or driveshafts and gearboxes). Thus, it follows that the coupling for engaging and disengaging the drivetrain 44 can be provided by various types of clutches, or alternately by a hydraulic valve, or by a belt tightener device including an actuator to apply operating tension to one or more drive belts. In the case of a hydraulic valve or belt-tensioning actuator, the coupling engages and disengages power transfer even though there is not a finite attachment/detachment of power transfer structures as with most clutches.

Figure 3:
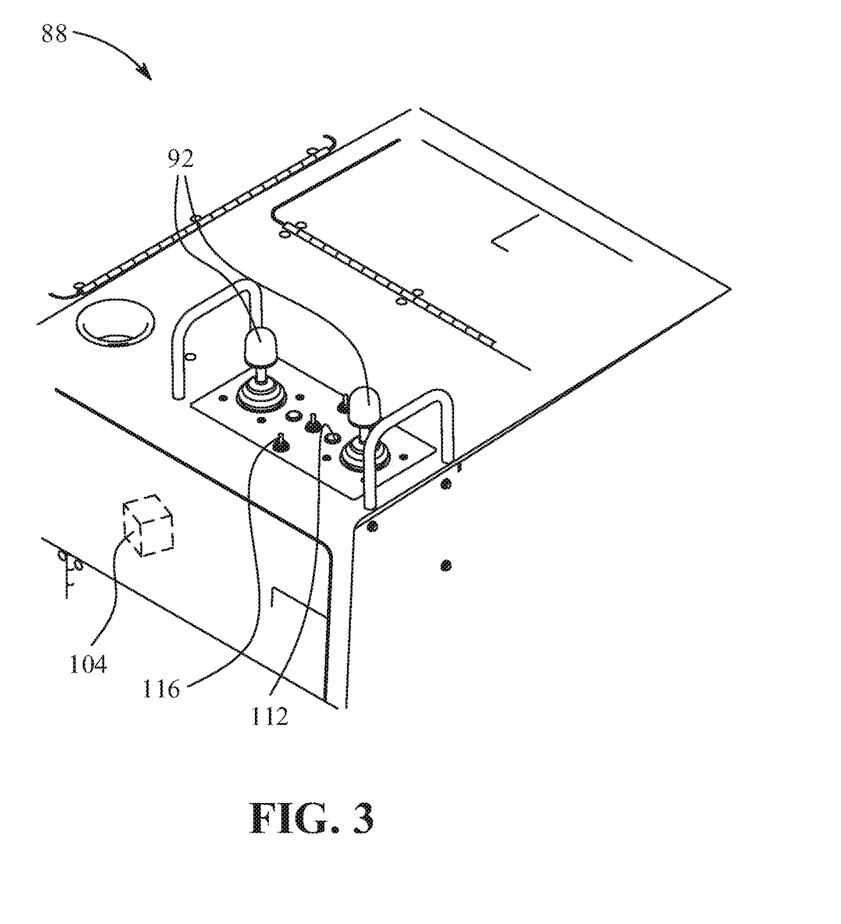
FIG. 3 is a perspective view of an operator station of the stump cutter machine including control levers, switches, and indicator lights for the stump cutter machine.

As explained in more detail below, the clutch 56 is engaged with the output shaft 40 of the engine 24 to drive the cutter wheel 26 through drivetrain 44, and can be automatically disengaged to stop the transfer of power from the engine 24 to the cutter wheel 26. The clutch 56 can be any coupling that selectively enables or disables power transfer from a prime mover or engine 24. Referring to FIG. 2, the stump cutter machine 4 includes an operator control station 88 that has levers 92 to control movement of the boom 12 and the cutter wheel 26. As shown, the control station 88 has handles or levers 92 that are used by an operator to position the cutter wheel 26 via movement of the boom 12, although fewer or more levers or controls may be provided. With reference to FIGS. 2 and 3, the levers 92 optionally include sensors 96 (e.g., capacitance sensors) that are part of a control system 100 and that detect the presence of an operator at the operator control station 88. The sensors 96 may have an equal or differing predetermined fixed delay period to allow an operator to move between the levers 92. Equal or different delay periods may be employed for each of the sensors 96 (e.g., depending on the last sensor touched by the operator). In addition, the delay periods may be of variable duration based on operational characteristics of the stump cutter machine 4 (e.g., longer when the cutter wheel 26 is rotating at relatively high speed, and shorter when the speed is relatively low).

An exemplary operator presence system ("OPS") is described in U.S. Pat. No. 8,257,227 (assigned to Vermeer Manufacturing Company), the entire contents of which are incorporated by reference in their entirety. For example, the signals from the sensors 96 indicating the presence (or absence) of an operator are communicated to a controller 104 of the control system 100 via wires or wirelessly, or some combination of wires and wireless communication. With continued reference to FIG. 4, the control system 100 also is in communication with other inputs and outputs of the stump cutter machine 4. As shown, the outputs include a clutch relay or solenoid 108, a clutch light 112, and a clutch switch 116. An operator can manually engage the clutch 56 by manipulating the clutch switch 116, and the clutch light 112 illuminates to provide a visual indication to an operator regarding the status of the clutch 56. When an operator is no longer sensed to be present by the operator presence system (i.e. the system determines that the operator is absent from the station 88), the controller 104 de-energizes the clutch relay 108, which automatically disengages the clutch 56 so that the cutter wheel 26 is operatively disengaged from the engine 24 (i.e. the wheel 26 is no longer rotated by the drivetrain 44). In addition, the brake 62 may be engaged to stop the cutter wheel 26. One or more additional diagnostic or status identifiers 120 may be included in the control system 100 to convey useful information to the operator. The brake 62 may be separate from or integrated into the clutch 56.

Figure 4:
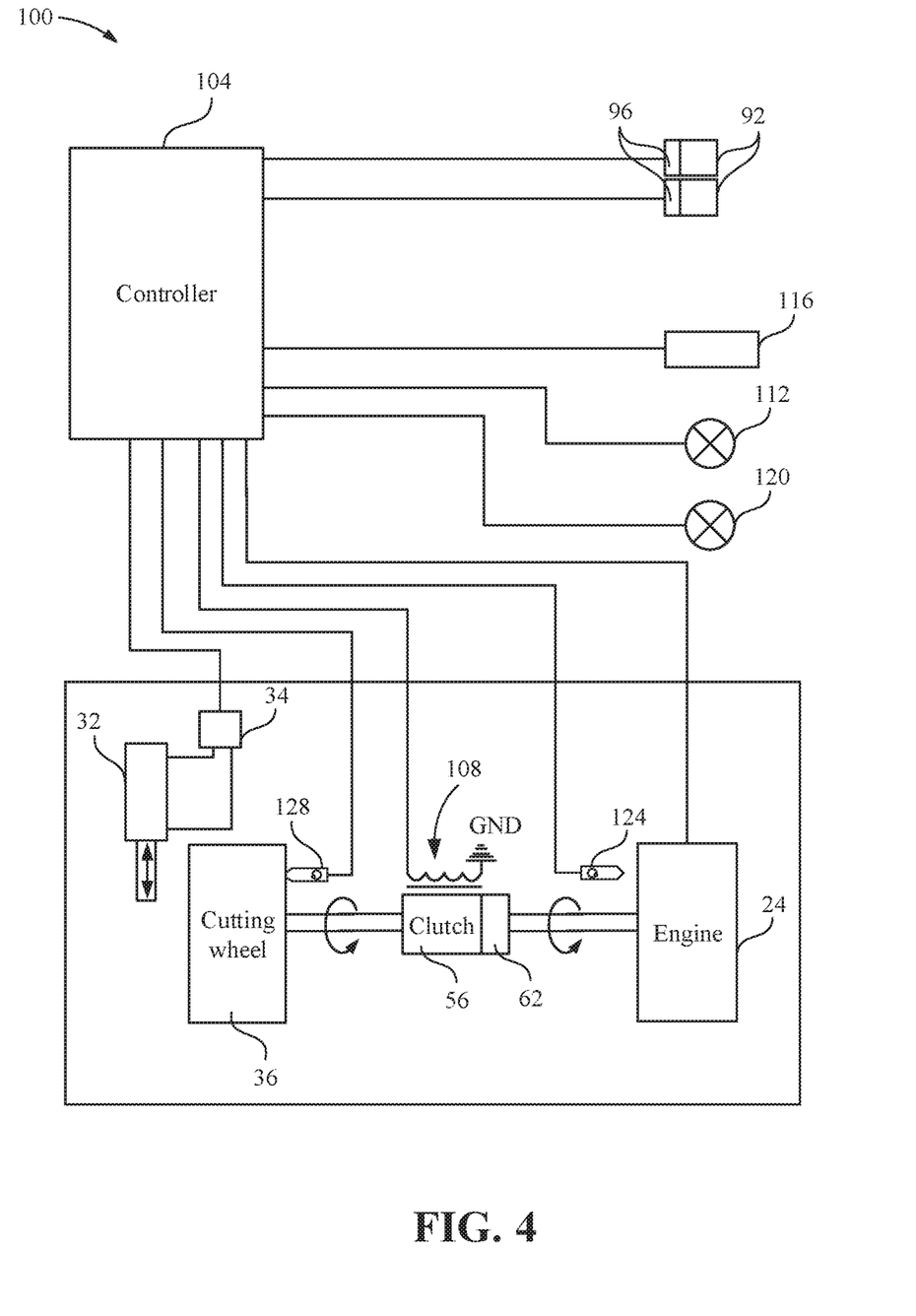
FIG. 4 is a schematic illustration of a control system including the controls of FIG. 2.

As shown in FIG. 4, the controller 104 monitors the speed (i.e., rotational speed) of the engine 24 via an engine speed sensor 124. The controller 104 can also or alternately monitor the speed (i.e., rotational speed) of the cutter wheel 26 via a wheel speed sensor 128. The engine speed sensor 124 is positioned adjacent the engine 24 and detects rotation of the shaft 40 (not labelled in FIG. 4), and the wheel speed sensor 128 is positioned adjacent the cutter wheel 26 and detects rotation of the driveshaft 80 (not labelled in FIG. 4). The sensors 124, 128 may be any type of sensors capable of measuring rotations of the engine 24 and the cutter wheel 26, respectively. Based on the feedback or signals from the sensors 96 and the engine speed sensor 124, the controller 108 may automatically disengage the clutch 56 and/or move the cutter wheel 26 via the boom 12. Engine and/or cutter wheel speed (e.g., in revolutions per minute "RPM") can be determined from the output(s) of the sensor(s) 124, 128 in conjunction with a clock or "timer." Such a timer may be provided within the controller 104 that receives pulse signals from the sensor(s) 124, 128 indicative of rotational movement of the engine 24 and/or the cutter wheel 26.

Although specific examples given herein refer to engine speed detected by the engine speed sensor 124, cutter wheel speed detected by the wheel speed sensor 128 may be a suitable substitute (or even used in conjunction). For example, under normal operating conditions, there is a fixed, known relationship between the engine speed and the cutter wheel speed when the clutch 56 is engaged. Thus, determination of the engine speed can effectively be made by correlating a speed of the cutter wheel 26 to engine speed for comparing to engine speed thresholds, or the thresholds themselves may be set as cutter wheel speed thresholds. In some constructions, the stump cutter machine 4 may include only the engine speed sensor 124, or only the wheel speed sensor 128, and not the other.

As referenced above, the illustrated stump cutter machine 4 also includes a feature that automatically moves the cutter wheel 26 with respect to the stump being reduced (e.g., to sweep the cutter wheel 26 laterally along the stump). An exemplary control is described and illustrated in U.S. Pat. No. 6,014,996 (assigned to Vermeer Manufacturing Company), the entire contents of which are incorporated by reference in their entirety. Such features have been previously provided to the marketplace by Vermeer Manufacturing Company, marketed as SmartSweep® or AutoSweep®. For example, during the process of reducing a stump, automatic sweep control moves the cutter wheel 26 (via the boom 12) across the width of a stump at a predetermined rate that is based on the speed of the engine 24. The maximum sweep speed of the automatic sweep control is predetermined in the control system or set using a lever on the control panel 88. When the engine speed sensor 124 detects that the speed of the engine 24 has decreased below a predetermined speed due to increased cutting load on the cutter wheel 26, the controller 104 automatically adjusts (i.e., reduces) the sweep speed of the cutter wheel 26 across the stump. The automatic sweep speed reduction can be accomplished in some constructions by bleeding hydraulic fluid from the boom swing cylinder 32.

The engine 24 of the stump cutter machine 4 may have idle ("low idle") and high idle speeds. The idle speed of the engine 24 may be varied by the operator via controls at the control station 88 (low/high selection, or continuously variable between low and high limits). Low idle can be a speed from 1000 RPM to 2000 RPM in some constructions, and high idle can be a speed from 3500 RPM to 4500 RPM. In one non-limiting example, the low idle speed is 1600 RPM, and the high idle engine speed is 4100 RPM. If the engine speed drops to or below a first predetermined speed (e.g., 4000 RPM), the controller 104 bleeds a portion of the hydraulic fluid flow to the boom swing cylinder 32, which slows movement of the boom 12 and consequently the sweep speed of the cutter wheel 26 across the stump. When the engine speed drops to or below a second predetermined speed (e.g., 3300 RPM), all hydraulic fluid to the boom swing cylinder 32 is bled off by the controller 104. The amount of hydraulic fluid that is bled off can be based on the engine speed—more fluid is bled off as the engine speed drops from the first predetermined speed toward the second predetermined speed. When all fluid is bled off, the boom 12 no longer moves laterally, i.e., the sweep motion is stopped. If and when the engine speed recovers, the controller 104 increases the flow of hydraulic fluid to the boom swing cylinder 32 to reinitiate automatic sweep. Under the automatic control, the sweep movement can restart at the maximum sweep speed, or may increase gradually based on the engine speed as engine speed increases.

The stump cutter machine 4 further includes a drivetrain protection system ("DPS") that minimizes or prevents damage to components of the drivetrain 44 (e.g., the belts 48, 52) when the drivetrain 44 experiences a significant increase in cutting load, referred to herein as an overload condition. It should be appreciated that the drivetrain protection system may default to a disabled condition, and may only be activated to operate during a predetermined running range of the stump cutter machine 4, after an initial start-up process that gets the cutter wheel 26 up to a running speed, or "normal" running. In normal running, the engine 24 runs at a non-zero speed and the cutter wheel 26 rotates at a speed that correlates to the engine speed according to the drivetrain transmission ratio (e.g., determined by pulley diameter ratios). A separate start-up protection system or procedure may be carried out to engage the coupling for initially running up the cutter wheel 26 from a stationary condition. For example, the engine 24 may be set at or near low idle speed when engaging the clutch 56 (or activating an actuator of a belt tightener to tension the drivetrain 44 into operating tension). In some constructions, the control system may only enable the clutch 56 to engage when the engine 24 is at low idle. While the invention is described in detail relative to preventing failure of the belts 48, 52 due an overload condition, it will be appreciated that the drivetrain protection system can protect or prevent damage to other components of the drivetrain 44. The drivetrain protection system is part of the same machine control system 100 as the other control features disclosed herein, implemented either within the same physical controller 104 or a separate controller. Although the illustrated drivetrain 44 is a belt-type mechanical drivetrain (e.g., including the belts 48, 52), aspects of the drivetrain protection system are not necessarily limited as such, and the drivetrain protection system may be provided in a stump cutter or other material reduction machine having or including additional or alternative drivetrain components, including but not limited to a hydraulic drive system, or gearbox for example. In a hydraulic drive system having, for example, a hydraulic pump, a hydraulic motor, hoses, and valves, the coupling that is selectively disengaged by the drivetrain protection system can be provided as a hydraulic valve that partially or fully interrupts the supply of pressurized hydraulic fluid to the hydraulic motor driving the cutter wheel 26.

In some constructions, the drivetrain protection system not only automatically disengages the clutch 56 if the engine speed reaches a designated threshold, but will also stop the sweeping movement of the boom 12 if the drivetrain protection system is implemented on a stump cutter machine 4 that includes automatic sweep control. Stopping the sweeping motion of the boom 12 in this situation prevents damage to the cutter wheel 26 and the drivetrain 44.

FIGS. 5-8 illustrate different control processes for the stump cutter machine 4 using data from the engine speed sensor 124 and/or the wheel speed sensor 128. Common processes are labeled with the same reference numerals for ease of understanding. The controller 104 uses the feedback from the sensors 96, the engine speed sensor 124, and the wheel speed sensor 128 to carry out instructions corresponding to the example methods and stored on the controller 104. At start-up, the drivetrain protection system is initially disabled. The drivetrain protection system is enabled, or "activated" in response to determining that the engine speed reaches or exceeds a first threshold or activation threshold (e.g., when the engine speed is at or above 3500 RPM). The activation threshold can be above the low idle speed, and can be between the low and high idle speeds. In other words, engine speed must be ramped up to enable the drivetrain protection system following start-up of the cutter wheel 26 at or near low idle speed, otherwise the drivetrain protection system remains in a disabled state. Once enabled, the drivetrain protection system then operates automatically to selectively disengage the clutch 56 to prevent damage to the drivetrain 44 in response to a trigger condition, or "trigger." The trigger can be identification of the engine speed dropping below a second threshold, or "overload threshold" (e.g., 2500 RPM). It should be understood that the activation threshold for enabling the drivetrain protection system is lower than the first predetermined speed at which the automatic sweep control begins bleeding off flow from the boom swing cylinder 32. Further, the DPS overload threshold is set at or below the second predetermined speed of the automatic sweep control so that the drivetrain protection system does not interfere with the full range of automatic sweep operation. After a disengagement, the clutch 56 may be manually re-engaged by the operator: the operator presses the clutch ON switch 96 which provides an input to the controller 104 to engage the clutch 56. The drivetrain protection system can work independent of or in conjunction with the operator presence system and/or the automatic sweep control.

The drivetrain protection system also automatically disengages the clutch 56, after being enabled, if the cutter wheel 26 is slowed manually by the operator to the point where the engine speed is lower than the overload threshold (i.e., the slowing of the cutter wheel 26 is not directly attributable to increased cutting load). In other constructions, the drivetrain protection system is only responsive to unintentional slowing, while deliberate operator-directed slowing is disregarded by the drivetrain protection system. For example, the drivetrain protection system, before enacting the DPS clutch disengagement, can take into consideration the operator throttle control setting on the stump cutter machine 4 to determine whether the reduced speed of the cutter wheel 26 and corresponding engine speed is attributable to cutting load from the stump, or simply operator-directed.

Figure 5:
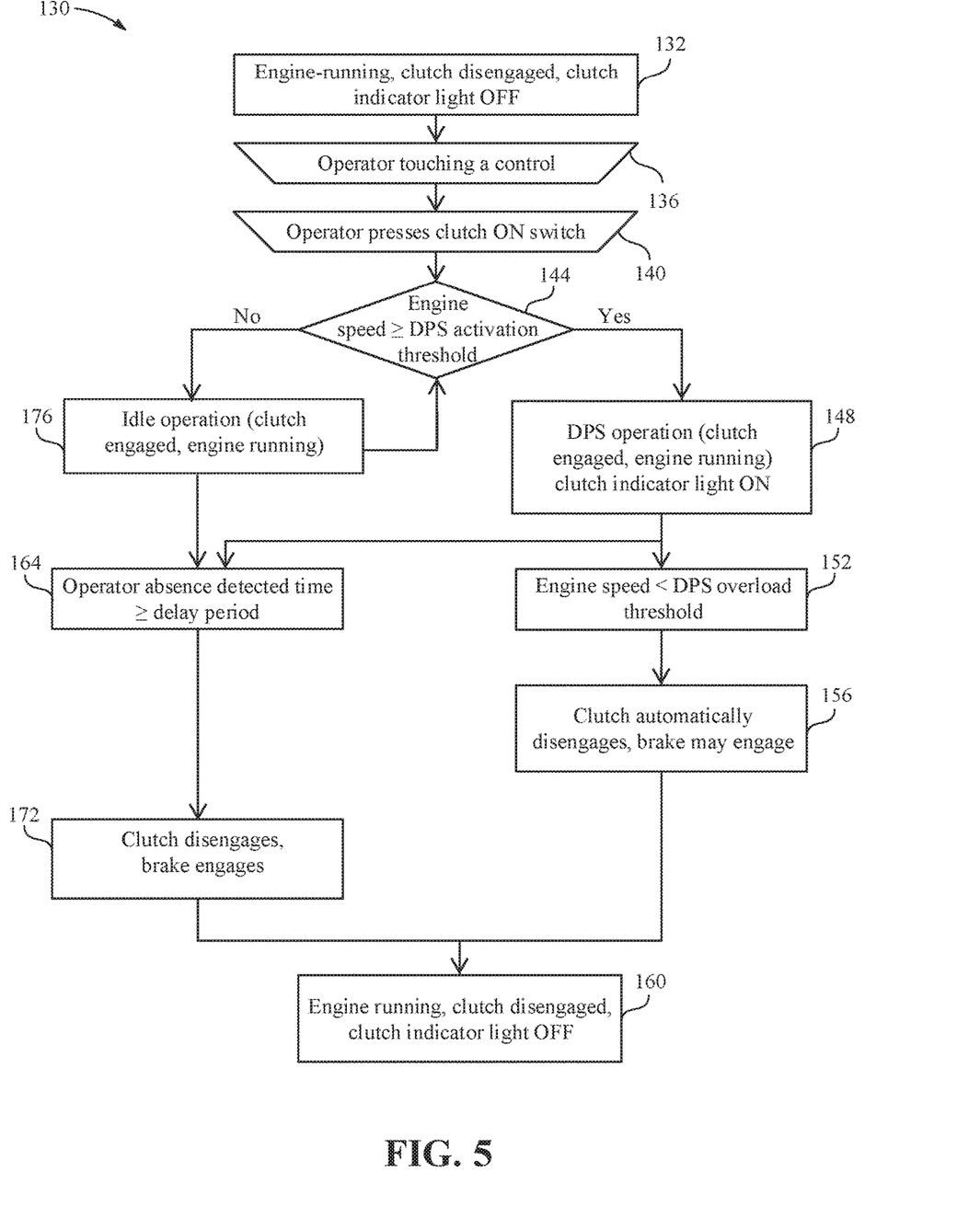
FIG. 5 is a flow chart illustrating an exemplary control sequence for the stump cutter machine.

FIG. 5 is an exemplary flowchart illustrating a control process 130 that is implemented by the control system 100 for the stump cutter machine 4 including the drivetrain protection system and the operator presence system (with or without automatic sweep control). At block 132, the controller 104 determines that the engine 24 is running and that the clutch 56 is disengaged (meaning the clutch indicator light 112 is off). At block 136, the controller 104 verifies that the operator is present based on contact with one or more of the levers 92. At block 140, the clutch 56 is engaged by manipulating the clutch switch 116, which turns on the clutch indicator light 112. Step 140 should only occur with the engine at idle, in order to avoid damage to the clutch 56. After the clutch 56 is engaged, the operator increases the engine speed from idle to operating speed. The controller 104 determines at block 144 whether the engine speed is at or above the DPS activation threshold.

If the control system 100 determines that the engine speed is at or above the DPS activation threshold ("Yes" at block 144), indicating that the operator has increased the engine speed from idle to operating speed, the drivetrain protection system is activated and the control system 100 begins to monitor the engine speed, via the engine speed sensor 124, at block 148 (referred to as "DPS operation") to determine whether the engine speed drops below the DPS overload threshold. After block 148, the control system 100 determines whether the operator is present (i.e. not absent for a predefined delay period) via the operator presence system. With the operator present, the drivetrain protection system determines that the engine speed is less than the DPS overload threshold at block 152. As a result, the drivetrain protection system automatically disengages the clutch 56, by a signal output from the controller 104. In some instances, the drivetrain protection system engages the brake 62 to affirmatively stop the cutter wheel 26. After the clutch 56 has been disengaged, the engine 24 remains running and the clutch light 112 is turned off to indicate to the operator that the clutch 56 is disengaged (block 160).

With the drivetrain protection system operational after block 148, the operator presence system determines whether the operator has been absent for a time that equals or exceeds the delay period (block 164), which may account for cutter wheel deceleration time. If not, the system returns to idle operation. If so, the system automatically disengages the clutch 56. In some instances, the system engages the brake 62 to affirmatively stop the cutter wheel 26. After the clutch 56 has been disengaged, the engine speed recovers and the engine 24 continues to run, and the clutch light 112 is turned off to indicate to the operator that the clutch is disengaged (block 160).

In some cases an operator may engage the clutch 56 and then release the controls without ever increasing engine speed to the operating speed. In this case the control system 100 determines that the engine speed is less than the activation threshold ("No" at block 144), the control system 100 continues "idle operation" of the stump cutter machine 4 with the engine 24 at or near low idle speed (i.e. the engine speed is lower than the activation threshold) with the clutch 56 engaged (block 176). Thereafter, the control system 112 begins to monitor for the presence of the operator. If the operator presence system determines that the operator is present, the control process 130 returns to block 144. Otherwise the control process 130 moves to block 164 and the system 114 functions according to the determinations and steps taken with regard to blocks 164, 172, 160 (in order) as described above.

Figure 6:
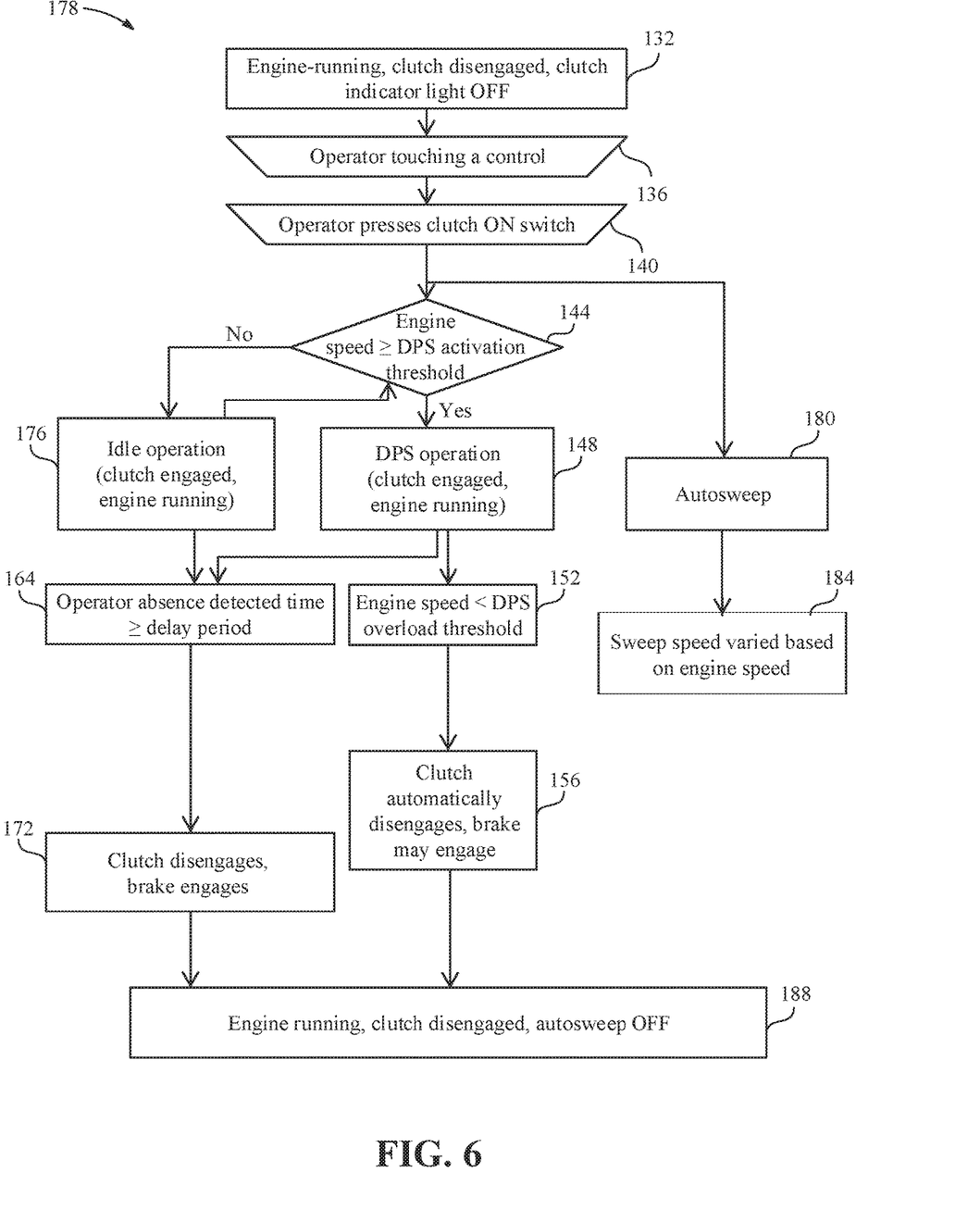
FIG. 6 is a flow chart illustrating another exemplary control sequence for the stump cutter machine.

FIG. 6 is another exemplary flowchart illustrating a control process 178 that can be implemented by the control system 100 for the stump cutter machine 4 including the drivetrain protection system, the operator presence system, and the automatic sweep control. The drivetrain protection system and the operator presence system are the same as described with regard to FIG. 5.

At block 132, the controller 104 determines that the engine 24 is running and that the clutch 56 is disengaged (meaning the clutch indicator light 112 is off). At block 136, the controller 104 verifies that the operator is present based on contact with one or more of the levers 92. At block 140, the clutch 56 is engaged by manipulating the clutch switch 116, which turns on the clutch indicator light 112. The controller 104 determines at block 144 whether the engine speed is above the activation threshold.

If the control system 100 determines that the engine speed is at or above the activation threshold ("Yes" at block 144), the drivetrain protection system is activated and the control system 100 begins to monitor the engine speed to determine whether the engine speed reaches or drops below the overload threshold at block 148 (DPS operation). After block 148, the control system 100 determines whether the operator is present (i.e. not absent for a predefined delay period) via the operator presence system. With the operator present, the drivetrain protection system determines that the engine speed is less than the overload threshold at block 152. As a result, the drivetrain protection system automatically disengages the clutch 56. In some instances, the drivetrain protection system engages the brake 62 to affirmatively stop the cutter wheel 26. After the clutch 56 has been disengaged, the engine 24 remains running and the clutch light 112 is turned off to indicate to the operator that the clutch is disengaged (block 188).

With the drivetrain protection system operational after block 148, the operator presence system determines whether the operator has been absent for a time that equals or exceeds the delay period (block 164). If so, the system automatically disengages the clutch 56. In some instances, the system engages the brake 62 to affirmatively stop the cutter wheel 26. After the clutch 56 has been disengaged, the engine speed recovers and the engine 24 continues to run, and the clutch light 112 is turned off to indicate to the operator that the clutch is disengaged (block 188).

If the control system 100 determines that the engine speed is less than the activation threshold ("No" at block 144), the control system 100 operates the stump cutter machine 4 with the engine 24 at an idle speed (i.e. the engine speed is lower than the activation threshold) with the clutch 56 engaged and the clutch light 112 flashing (block 176). Thereafter, the control system 112 begins to monitor for the presence of the operator. If the operator presence system determines that the operator is present, the control process 178 returns to block 144. Otherwise the control process 178 moves to block 164 and the system 114 functions according to the determinations and steps taken with regard to blocks 164, 172, 188 (in order) as described above.

In the control process 178, the automatic sweep control is implemented after or when the operator actuates the clutch switch 116 regardless of whether the drivetrain protection system is activated. In block 180, the engine speed sensor 124 monitors the engine speed. In block 184, the speed of the cutter wheel 26 across the stump is changed based on the engine speed. If the engine speed is at or above 4000 RPM, the speed of the cutter wheel 26 moving across the stump is not reduced. If the engine speed is 3000 or less, the speed of the cutter wheel 26 moving across the stump is fully stopped until the engine speed increases again. In this example, for an engine speed between 3000 and 4000 RPM, the lateral moving speed of the cutter wheel 26 across the stump is an intermediate speed between full speed and stationary. The automatic sweep control runs simultaneously with the drivetrain protection system operation and the operator absence presence system. If the clutch 56 is disengaged for any reason, the engine 24 continues running and the automatic sweep operation is turned off (block 188).

Figure 7:
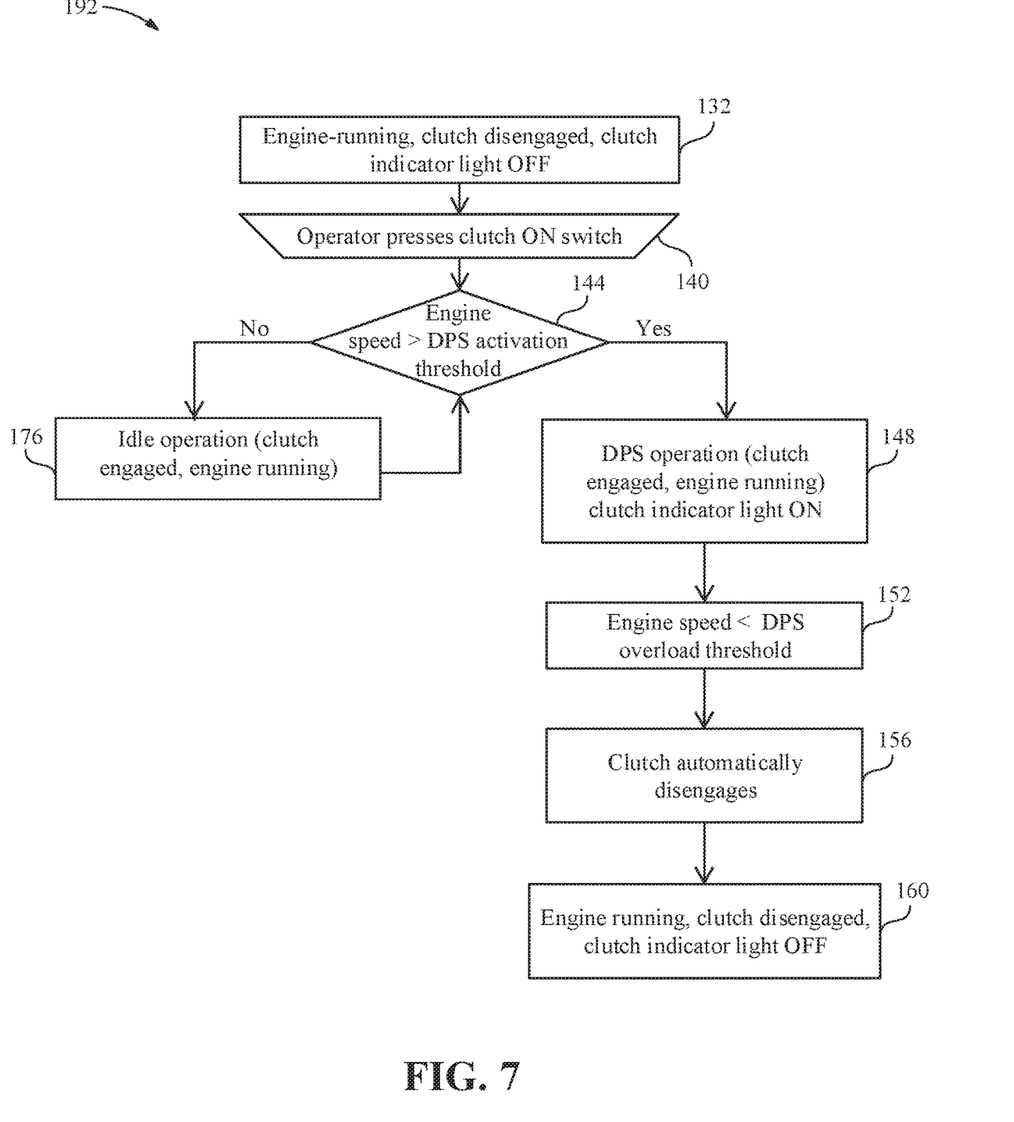
FIG. 7 is a flow chart illustrating another exemplary control sequence for the stump cutter machine.

FIG. 7 depicts another exemplary control process 192 that is implemented by the control system 100 for the stump cutter machine 4 including only the drivetrain protection system (i.e. without the operator presence system and the automatic sweep control). The steps in this control process mirror the blocks described with regard to the drivetrain protection system of FIG. 5. More specifically, at block 132, the controller 104 determines that the engine 24 is running and that the clutch 56 is disengaged (meaning the clutch indicator light 112 is off). At block 140, the clutch 56 is engaged by manipulating the clutch switch 116, which turns on the clutch indicator light 112. The controller 104 determines at block 144 whether the engine speed is above the activation threshold.

If the control system 100 determines that the engine speed is at or above the activation threshold ("Yes" at block 144), the drivetrain protection system is activated and the control system 100 begins to monitor the engine speed to determine whether the engine speed reaches or drops below the overload threshold at block 148 (DPS operation). After block 148, the control system 100 determines whether the operator is present (i.e. not absent for a predefined delay period) via the operator presence system. With the operator present, the drivetrain protection system determines that the engine speed is less than the overload threshold at block 152. As a result, the drivetrain protection system automatically disengages the clutch 56. In some instances, the drivetrain protection system engages the brake 62 to affirmatively stop the cutter wheel 26. After the clutch 56 has been disengaged, the engine 24 remains running and the clutch light 112 is turned off to indicate to the operator that the clutch is disengaged (block 160).

If the engine speed has not reached the activation threshold, the stump cutter machine 4 is in idle operation with the clutch 56 engaged and the clutch indicator light 100 flashing (block 176). The stump cutter machine 4 remains in idle operation until the engine speed reaches the activation threshold.

Figure 8:
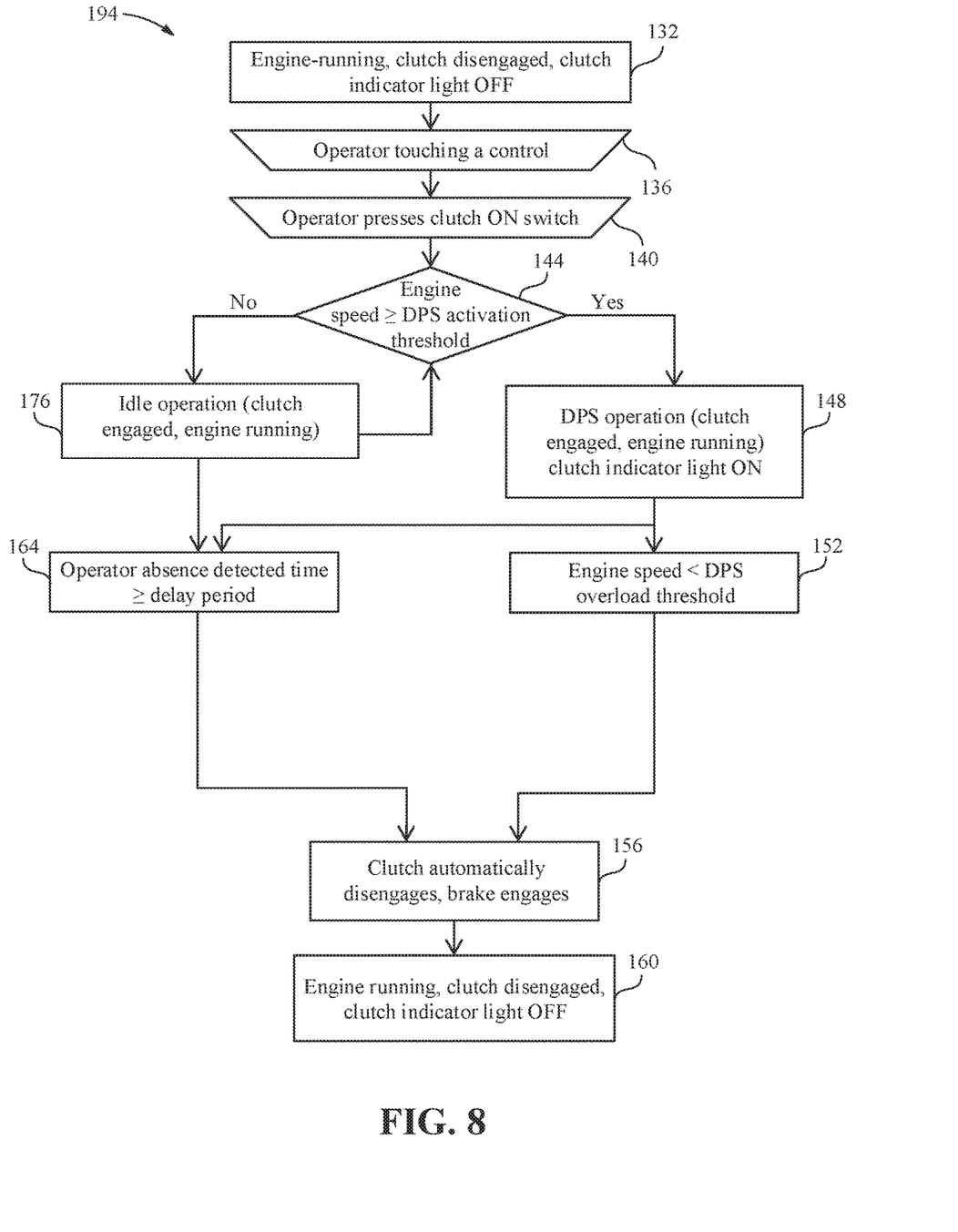
FIG. 8 is a flow chart illustrating another exemplary control sequence for the stump cutter machine.

FIG. 8 illustrates another exemplary control process 194 that is implemented by the control system 100 for the stump cutter machine 4 including the drivetrain protection system and a portion of the operator presence system. The control process 194 does not include automatic sweep control. At block 132, the controller 104 determines that the engine 24 is running and that the clutch 56 is disengaged (meaning the clutch indicator light 112 is off). At block 136, the controller 104 verifies that the operator is present based on contact with one or more of the levers 92. At block 140, the clutch 56 is engaged by manipulating the clutch switch 116, which turns on the clutch indicator light 112. The controller 104 determines at block 144 whether the engine speed is above the activation threshold.

If the control system 100 determines that the engine speed is at or above the activation threshold ("Yes" at block 144), the drivetrain protection system is activated and the control system 100 begins to monitor the engine speed to determine whether the engine speed reaches or drops below the overload threshold at block 148 (DPS operation). After block 148, the control system 100 determines whether the operator is present (i.e. not absent for a predefined delay period) via the operator presence system. With the operator present, the drivetrain protection system determines that the engine speed is less than the overload threshold at block 152. As a result, the drivetrain protection system automatically disengages the clutch 56. In some instances, the drivetrain protection system engages the brake 62 to affirmatively stop the cutter wheel 26. After the clutch 56 has been disengaged, the engine 24 remains running and the clutch light 112 is turned off to indicate to the operator that the clutch is disengaged (block 160).

With the drivetrain protection system operational after block 148, and when the operator presence system determines if the operator has been absent for a time that equals or exceeds the delay period (block 164). If so, the system automatically disengages the clutch 56. In some instances, the system engages the brake 62 to affirmatively stop the cutter wheel 26. After the clutch 56 has been disengaged, the engine 24 continues to run, and the clutch light 112 is turned off to indicate to the operator that the clutch is disengaged (block 160).

If the control system 100 determines that the engine speed is less than the activation threshold ("No" at block 144), the control system 100 operates the stump cutter machine 4 with the engine 24 at an idle speed (i.e. the engine speed is lower than the activation threshold) with the clutch 56 engaged and the clutch light 112 flashing (block 176). Thereafter, the control system 112 begins to monitor for the presence of the operator. If the operator presence system determines that the operator is present (i.e. the delay period has not elapsed), the control process 178 returns to block 144. Otherwise, the control process 194 moves to block 164 and the system 100 functions according to the determinations and steps taken with regard to blocks 164, 156, and 160 (in order) as described above.

In operation, the operator positions the stump cutter wheel 26 at one edge of the stump so that the stump cutter wheel 26 moves across the width of the stump. As the cutter wheel 26 moves across the stump, higher loads may be placed on the cutter wheel 26 due to, for example, knots in the stump. If the load placed on the cutter wheel 26 is too large, the drivetrain protection system operates to disengage power transfer from the engine 24 to the cutter wheel 26 based on a threshold speed that corresponds to a load on the cutter wheel 26 that less than what is expected to cause damage to the belts 48, 52 or another power transfer element of the drivetrain. Thus, the drivetrain protection system reduces downtime of the stump cutter machine 4 by reducing the need for maintenance or part replacement. As mentioned above, the drivetrain protection system can work in conjunction with the operator presence system and/or the automatic sweep system, in order to provide an integrated control process for controlling operation of the stump cutter machine 4.

Although the invention has been described in detail with reference to certain preferred embodiments, variations and modifications exist within the scope and spirit of one or more independent aspects of the invention as described.

The invention claimed is:

1. A material reduction machine comprising:
   an engine;
   a material reduction tool;
   a drivetrain including a coupling and a power transfer element coupled to and driven by the engine when the coupling is in an engaged state, the engaged state configured to enable transfer of power from the engine through the power transfer element for driving the material reduction tool, the coupling further having a disengaged state configured to inhibit transfer of power from the engine through the power transfer element; and
   a control system including
      a sensor in communication with the engine or the material reduction tool to detect a speed of the engine or the material reduction tool,
      a drivetrain protection system selectively operable during operation of the material reduction tool and, when triggered, configured to protect the power transfer element by putting the coupling into the disengaged state, and
      a controller including instructions configured to enable the drivetrain protection system in response to a first signal from the sensor indicative of the speed at or above a first threshold, the controller further including instructions to trigger the drivetrain protection system in response to a second signal from the sensor indicative of the speed below a second threshold.

2. The material reduction machine of claim 1, wherein the second threshold is lower than the first threshold.

3. The material reduction machine of claim 1, wherein the engine is variable by operator control between a low idle speed and a high idle speed, and wherein both the first threshold and the second threshold correspond to engine speeds between the low idle speed and the high idle speed.

4. The material reduction machine of claim 1, wherein the engine is variable by operator control between a low idle speed and a high idle speed, and wherein the first threshold corresponds to an engine speed above the low idle speed.

5. The material reduction machine of claim 1, wherein the coupling includes a clutch.

6. The material reduction machine of claim 1, wherein the power transfer element includes a belt wrapped around first and second pulleys.

7. The material reduction machine of claim 1, wherein the control system further comprises an automatic control operable to move the material reduction tool at a predetermined movement speed along the material to be reduced, wherein the predetermined movement speed is based on the speed of the engine or the material reduction tool, and wherein the automatic control is configured to reduce the movement speed of the material reduction tool from the predetermined movement speed in response to detecting the speed of the engine or the material reduction tool being at or below a third threshold.

8. The material reduction machine of claim 7, wherein the automatic control is operable to stop movement of the material reduction tool along the material to be reduced in response to detecting the speed of the engine or the material reduction tool being at or below a fourth threshold, and wherein the second threshold is at or below the fourth threshold.

9. The material reduction machine of claim 7, wherein the material reduction machine is a stump cutter machine and the material reduction tool is a stump cutter wheel, and the automatic control is operable to move the stump cutter wheel laterally across a stump.

10. The material reduction machine of claim 1, wherein the control system further comprises an operator presence system configured to detect a presence of an operator in close proximity to or touching the material reduction machine, and wherein the controller further includes instructions to put the coupling into the disengaged state in response to the operator presence system determining that the operator is not present.

11. The material reduction machine of claim 1, further comprising a brake positioned and arranged to stop rotation of the material reduction tool when the coupling is in the disengaged state.

12. The material reduction machine of claim 1, wherein the sensor in communication with the engine to detect a speed of the engine.

13. A material reduction machine comprising:
   an engine;
   a material reduction tool;
   a drivetrain including a coupling and a belt coupled to and driven by the engine when the coupling is in an engaged state, the engaged state configured to enable transfer of power from the engine through the belt for driving the material reduction tool, the coupling further having a disengaged state configured to inhibit transfer of power from the engine through the belt; and
   a control system including
      a sensor in communication with the engine to detect a speed of the engine,
      a drivetrain protection system selectively operable during operation of the material reduction tool and, when triggered, configured to protect the belt by putting the coupling into the disengaged state, and
      a controller including instructions configured to enable the drivetrain protection system in response to a first signal from the sensor indicative of the speed at or above a first threshold, the controller further including instructions to trigger the drivetrain protection system in response to a second signal from the sensor indicative of the speed below a second threshold.

14. The material reduction machine of claim 13, wherein the second threshold is lower than the first threshold.

15. The material reduction machine of claim 13, wherein the engine is variable by operator control between a low idle speed and a high idle speed, and wherein both the first threshold and the second threshold correspond to engine speeds between the low idle speed and the high idle speed.

16. The material reduction machine of claim 13, wherein the engine is variable by operator control between a low idle speed and a high idle speed, and wherein the first threshold corresponds to an engine speed above the low idle speed.

17. The material reduction machine of claim 13, wherein the coupling includes a clutch.

18. The material reduction machine of claim 13, wherein the control system further comprises an automatic control operable to move the material reduction tool at a predetermined movement speed along the material to be reduced, wherein the predetermined movement speed is based on the speed of the engine or the material reduction tool, and wherein the automatic control is configured to reduce the movement speed of the material reduction tool from the predetermined movement speed in response to detecting the speed of the engine or the material reduction tool being at or below a third threshold.

19. The material reduction machine of claim 18, wherein the automatic control is operable to stop movement of the material reduction tool along the material to be reduced in response to detecting the speed of the engine or the material reduction tool being at or below a fourth threshold, and wherein the second threshold is at or below the fourth threshold.

20. The material reduction machine of claim 18, wherein the material reduction machine is a stump cutter machine and the material reduction tool is a stump cutter wheel, and the automatic control is operable to move the stump cutter wheel laterally across a stump.

21. The material reduction machine of claim 13, wherein the control system further comprises an operator presence system configured to detect a presence of an operator in close proximity to or touching the material reduction machine, and wherein the controller further includes instructions to put the coupling into the disengaged state in response to the operator presence system determining that the operator is not present.

22. The material reduction machine of claim 13, further comprising a brake positioned and arranged to stop rotation of the material reduction tool when the coupling is in the disengaged state.

23. A method of controlling a material reduction machine including an engine and a material reduction tool, the method comprising:
   providing a drivetrain including a power transfer element positioned between the engine and the material reduction tool and a coupling having an engaged state configured to enable transfer of power from the engine through the power transfer element for driving the material reduction tool, the coupling further having a disengaged state configured to inhibit transfer of power from the engine through the power transfer element;
   running the engine at an engine speed;
   imparting a rotational speed to the material reduction tool by transferring power from the engine to the material reduction tool via the drivetrain, including the power transfer element, with the coupling is in the engaged state;
   sensing, with a sensor that reports signals to a controller of a control system, one or both of the engine speed and the rotation speed of the material reduction tool;
   enabling, via the controller, a drivetrain protection system in response to a first signal from the sensor reporting the sensed engine speed or rotation speed at or above a first threshold; and
   triggering, via the controller, the drivetrain protection system to protect the power transfer element by putting the coupling into the disengaged state in response to a second signal from the sensor reporting the sensed engine speed or rotation speed below a second threshold.

* * * * *